US011476881B1

(12) United States Patent
Vieri (10) Patent No.: US 11,476,881 B1
(45) Date of Patent: Oct. 18, 2022

(54) SYSTEM TO REDUCE GLOBAL CELL PHONE RADIATION LEVELS

(71) Applicant: Riccardo Vieri, Florence (IT)

(72) Inventor: Riccardo Vieri, Florence (IT)

( * ) Notice: Subject to any disclaimer, the term of this patent is extended or adjusted under 35 U.S.C. 154(b) by 284 days.

(21) Appl. No.: 16/852,726

(22) Filed: Apr. 20, 2020

(51) Int. Cl.
*H04B 1/3827* (2015.01)
*H04M 1/72454* (2021.01)
*H04M 1/72457* (2021.01)

(52) U.S. Cl.
CPC ...... *H04B 1/3838* (2013.01); *H04M 1/72454* (2021.01); *H04M 1/72457* (2021.01); *H04B 2001/3844* (2013.01)

(58) Field of Classification Search
CPC ......... H04B 1/3838; H04B 2001/3844; H04M 1/72454; H04M 1/72457
See application file for complete search history.

(56) References Cited

U.S. PATENT DOCUMENTS

| 8,825,112 B1* | 9/2014 | Fraden | G01J 5/0265 455/344 |
| 2002/0107032 A1* | 8/2002 | Agness | H04B 7/01 455/501 |
| 2010/0203862 A1* | 8/2010 | Friedlander | H04B 17/318 455/575.5 |
| 2015/0127490 A1* | 5/2015 | Puertas | H04M 1/72457 705/26.62 |
| 2016/0100364 A1* | 4/2016 | Bitar | H04W 4/023 455/456.2 |
| 2017/0199979 A1* | 7/2017 | Reiner | G16H 10/60 |

FOREIGN PATENT DOCUMENTS

WO   WO-2017190232 A1 * 11/2017 ........... H04B 1/3838

OTHER PUBLICATIONS

In Compliance, Jun. 28, 2019, EMC Units in Measuring and Testing. p. 3. (Year: 2019).*

* cited by examiner

*Primary Examiner* — Nabil H Syed
*Assistant Examiner* — Cal J Eustaquio
(74) *Attorney, Agent, or Firm* — Bruce A. Lev (57) ABSTRACT

The instant invention provides a method and a system to reduce electromagnetic pollution deriving from smartphones and portable devices. Some mobile device modules can be disabled during a call or black screen mode. The user can be notified in case of abnormal values. The system and method operate using algorithms, software, devices, and databases allowing data sharing of user behavior, and allow for electromagnetic pollution data savings to be displayed on a map.

16 Claims, 8 Drawing Sheets

SYSTEM TO REDUCE GLOBAL CELL PHONE RADIATION LEVELS

CROSS-REFERENCE TO RELATED APPLICATION

There are no related applications incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The instant invention relates to the field of global electromagnetic pollution and exposure. More specifically, the instant invention is directed to a decentralized system wherein detected mobile device data is deactivated depending on specific actions from the user. Furthermore, an innovative method to reduce and share global worldwide electromagnetic exposure data on a map is disclosed.

2. Description of the Related Art

Globally, the phenomenon of electromagnetic pollution is becoming an ever increasing problem. There does not yet seem to be any accredited scientific evidence that proves the onset of severe diseases following exposure to non-ionizing radiation from mobile phones, wi-fi, Bluetooth, and 5G. However, there is specific scientific evidence pertaining to damage that overexposure by electromagnetic waves causes to DNA and the body in general.

SAR is the "specific absorption rate" and indicates the measure of the percentage of electromagnetic energy that is absorbed by the human body when exposed to a radiofrequency electromagnetic field. SAR values vary according to each smartphone device, and are one of the potentially dangerous elements, in particular for children. The Sar value and the exposure to radio frequencies by mobile phones, for example, increases with the absence of field and signal data. In this case, the device always searches for a signal and as a consequence it discharges the battery more quickly and creates more significant overheating of the mobile phone while possibly transferring that heat to a user's head.

Undoubtedly the advent of higher performing technologies such as 5G and the development of intelligent devices increases the global presence of electromagnetic waves in the Earth's atmosphere and around human beings, animals, flora, and fauna.

Home automation and robotics are also prevalent. Smart Televisions, Smart climatization units, Smart lighting, voice commands, ALEXA, and wi-fi are becoming more and more popular. In a 4-story apartment the average exposures to different electromagnetic sources to a single individual can exceed 30 EMR units. Furthermore, signal traffic of mobile devices may interfere with certain electro-medical devices and navigation systems.

There are currently no secure and commonly used solutions to reduce this problem in both personal and global situations. There are shielding material availables, however they only work by "isolating" devices and not allowing those device to receive signals, as such they are not easy to use because they prevent the use of a smartphone.

There are small adhesive devices that can be used on smartphones, however they are based on unproven scientific principles since they are not measurable and are based more on esoteric than technical principles.

There are bracelets one can wear incorporating unique materials that would "absorb" electromagnetic waves, or some that can can emit negative ions, however the quantity emitted can hardly bring tangible benefits.

Some devices incorporate a "grounding effect." However, they are expensive and usable while resting or driving.

None of the existing solutions can also limit the spread of waves globally, but only mitigate the problems individually.

The object of the instant invention is to have identified a solution that can be used by anyone and that not only reduces the risk of damage caused by electromagnetic pollution but which reduces the same on a global scale without changing people's habits and contributing to the development of a cleaner world.

This instant invention further provides a smart solution that allows a different use of available resources to obtain an optimization of the same with benefits in terms of waste, radiation damage, and optimization of the environment.

There is a need for a system and method that can be used by anyone to reduce their personal exposure.

Furthermore, there is a need for a solution to optimize asmartphones without being overly technical that decreases the radiation for the end-user.

Furthermore, there is a need for a method that allows providing global benefits to collectivity, reducing the pollution of non-ionizing radiation as a result of socially useful behavior.

Furthermore, there is a need for a method that helps children become more protected from damage caused by electromagnetic pollution and mobile phones.

Furthermore, there is a need for a method that statistically can help telecommunications companies to act on real data to reduce the potential damage of electromagnetic radiation.

Accordingly, the present invention overcomes the disadvantages associated with the prior art.

BRIEF SUMMARY OF THE INVENTION

The instant invention relates to the field of electromagnetic pollution and exposure. More specifically, the instant invention is directed to a decentralized system wherein the function of detecting data is deactivated depending on specific actions from the user.

The invention also contemplates the use of algorithms, mobile device sensors, cell phone tower power measurements, wi-fi sensor measurements, BLUETOOTH measurements, on line servers, and manual and automatic processes so to create the most reliable electromagnetic reduction result for a verified user.

The instant invention allows a user of a smartphone to interact with a central server through an "app" (computer application). The app allows the user to select a series of options that can disable Wi-Fi, data usage, and BLUETOOTH depending on user preferences and what is allowed by the operating system. The method also allows the user to prevent their telephone from continuously interrogating the telephone signal towers to pick up signals, which occurs when the signal field is low or undetectable. The user can set a value for the incoming value of the signal strength detected and, depending on the specific option, prevent the phone from increasing the exposure index of electromagnetic waves that continuously occurs when a smartphone is looking for a connection line.

The method of the instant invention includes the transmission of values detected by the smartphone of the user's exposure index. The user's exposure index value is calculated by determining the intensity in volts per meter from different sources detected by the sensors of the phone. The power values of wifi and BLUETOOTH signals from telephone operators are calculated and stored on a server. In particular, the values are detected with constant monitoring to verify the effectiveness of the use of the specific app that is able to totally disable or partially disable the sources of exposure.

It does not make sense to use sources that can create damage and pollute the environment with electromagnetic waves when they are not useful. It is useless to receive messages during a call. What is the benefit of receiving BLUETOOTH signal of nearby devices while we are talking on the phone? What is the use of BLUETOOTH when there is a black screen and we do not use the phone? This only creates higher environmental pollution levels.

A user of the app may decide to disable the gathering of mobile phone data globally or by individual apps. For example, you can disable data traffic both during a telephone conversation and during a black screen or when the phone is not in contact with the person. In the same way, a user can choose to disable BLUETOOTH operations during a phone call or a black screen but decide that the BLUETOOTH of the machine should still be available. In the same way a user can disable the wifi during a phone call or during a black screen, or partially enable it to operate a single app.

Some mobile operations could not allow disabling mobile data for security reasons. In this case, the instant invention allows the user to disable Http connection data, for example, using a "fake VPN" that can block all incoming and or outcoming internet signals. In this example, the battery is still consumed as data is received by the mobile device, but single app consumption and mobile radiation values and temperatures are slightly lower as the mobile data are not requested and received continuously.

The result of reducing unnecessary signals reduces environmental pollution especially if multiplied by a large number of smartphones on a global basis. If everyone adopted this system the wifi of their smart phone would "pollute" only when they do not speak on the phone or when the phone is in black screen mode, which is statistically most of the time given that the frequent use of the mobile phone according to some statistics is around 3-4 hours per day out of 24 hours.

The system of the instant invention is adapted such that when extremely high values are collected by the user it automatically disables certain data features (i.e., wi-fi, BLUETOOTH cellular signals, and data traffic) to preserve the health of the user or users of a specific area. For example, if the values of a geographical area detected by the server becomes too high all users who enabled that option could see their modules disabled to reduce the risk of damage from electromagnetic emissions.

With healthy social practices, thanks to the use of software, apps, servers, sensors, we can reduce the electromagnetic waves and provide benefits to humans, flora, and fauna.

Thanks to the interaction between sensors, data, and different devices, the benefits could also extend to other devices in use, such as smart TVs, appliances, and home automation systems. The creation of specific apps could also limit the electromagnetic pollution of devices always operating via wi-fi and or BLUETOOTH.

The statistical use of these types of data, including the calculation of an index of exposure by the user, would also allow companies of telephony and the research sciences to verify any correlation between the use of these devices and diseases by geographic location, sex, age, and other factors.

Furthermore, use of electromagnetic radiation data can create a map of the values of the electromagnetic exposure index. The exposure index can be calculated as an algorithmic formula that allows a user to assign a value in volts per meter and "measure" the level of pollution in the environment. For example, a smartphone can calculate the received power of the wi-fi, BLUETOOTH, data signal, and mobile signal strengths. Based on power, number of sources, and the distance between them, an index value is created idindicating the exposure in terms of "risk" to these display sources. The system and the method in question, include the calculation of the exposure index, are displayed to the user via apps in real-time creating an interactive map wherein each user anonymously displays the detection values on his map and sharing them, thus being able to create the a world map with the exposure indexes. This map can also show users' actions to limit pollution, such as the active hours of the Wi-Fi disable services, BLUETOOTH, and other data.

The invention also contemplates the option to use device proximity sensors. In this way the server getting data from mobil devices saves the information and understands if the user keeps the phone in the proximity to their body and rewards them for proper social behavior or adjusts retrieved data to be even more accurate.

The exposure index value and user rewards can be adjusted using mobile device sensors and motion detection to achieve a higher rate of accuracy. For example, if a user has their phone close to their body the values are acceptable, however, if the user has the phone far from them they will get less radiation and the accuracy can be increased.

For anonymity and safer usage, a "blockchain" environment can be the ideal choice to save data. Based on the values reached in terms of radiation exposure, the system can send a "warning" notification sound and a related alert message. In this way the sound becomes a hardware alarm system. If a threshold exceeds a specified value, the system warns the user.

Based on the values reached in terms of radiation exposure on the map, the system can send a "warning" notification sound and a related alert message to a group of users of a determined zone in the map where values are getting abnormal.

The method allows for virtuous behavior, i.e., reducing electromagnetic pollution caused to the community, can bring economic benefits or premiums, like discounts, cryptocurrencies, free products, or services.

The system also provides for the use of waves and sounds that science has proven to be safer for humans. For example, the alpha, beta, delta, and theta frequencies are made available to a user. According to science, these binaural sounds could provide benefits in various forms including that of reducing the effects of electromagnetic pollution on the brain. Mobile Phone Chips Reduce (https://www.ncbi.nlm.nih.gov/pmc/articles/PMC5893900/) EEG Brain Activity Induced by Mobile Phone-Emitted Electromagnetic Fields. Neurophysiological studies indicate that exposure to electromagnetic fields (EMFs) generated by mobile phone radiation can exert effects on brain activity. Alterations in human EEG induced by mobile phone emitted EMFs have been reported for all common frequency bands (delta, theta, alpha, beta, gamma) of the EEG.

The benefits of neural sounds have been studied for years to relieve Alzheimer's, neurological diseases and act on the brain. It seems that numerous researches have shown beneficial effects also on humans, in particular by using low-frequency sounds.

Depending on the exposure index detected, if it exceeds certain thresholds, warnings can be activated automatically, and sounds introduced into the environment.

The system and methods of the invention may operate over a global area network (GAN), such as the internet, a wide area network (WAN), a local area network (LAN), or any other type of network or combination of the network. According to the instant invention, a mobile device may generate data using sensors with or without a network connection. If a network connection is not available data can be stored and transmitted upon the availability of a working connection.

It is also contemplated that errors caused by non-human verification can be reduced by validating more parameters provided by the user such as social presence, websites, links, pictures, and a circle of people.

The instant invention is also adaptable to work with any existing network. Special API language allows external companies to use this technology and brand with proper Logo and or commercial name Furthermore, the instant invention enables a variety of statistics to be gathered. These statistics may be valuable for social economic analysis and consumer trends.

The system and methods of the invention may also include a social platform and a chat forum for communication between the users thereby creating a rated community of users. The rating may also occur deriving from user EMF detection and reduction by smartphone sensors.

The invention and its attributes and advantages may be further understood and appreciated with reference to the detailed description below of one contemplated embodiment, taken in conjunction with the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention.

The various embodiments of the present invention will hereinafter be described in conjunction with the appended drawings.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

This disclosure is not limited to the particular systems, and methodologies described herein, as there can be multiple possible embodiments of the present disclosure which are not expressly illustrated in the present disclosure. It is also to be understood that the terminology used in the description is for describing the versions or embodiments only, and is not intended to limit the scope of the present disclosure.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in various embodiments," "in one embodiment" "in another embodiment" "in some configurations," or "in some instances," which may each refer to one or more of the same or different embodiments, configurations, or instances. Furthermore, the terms "comprising," "including," "having," and the like, as used with respect to embodiments of the present invention, are synonymous with the definition afforded the term "comprising.

The terms "coupled" and "connected," along with their derivatives, may be used. It should be understood that these terms are not intended as synonyms for each other. Rather, in particular, embodiments, "connected" may be used to indicate that two or more elements are in direct physical contact with each other. "Coupled" may mean that two or more elements are in direct physical or electrical contact. However, "coupled" may also mean that two or more elements are not in direct contact with each other, but yet still cooperate or interact with each other.

Figure 1:
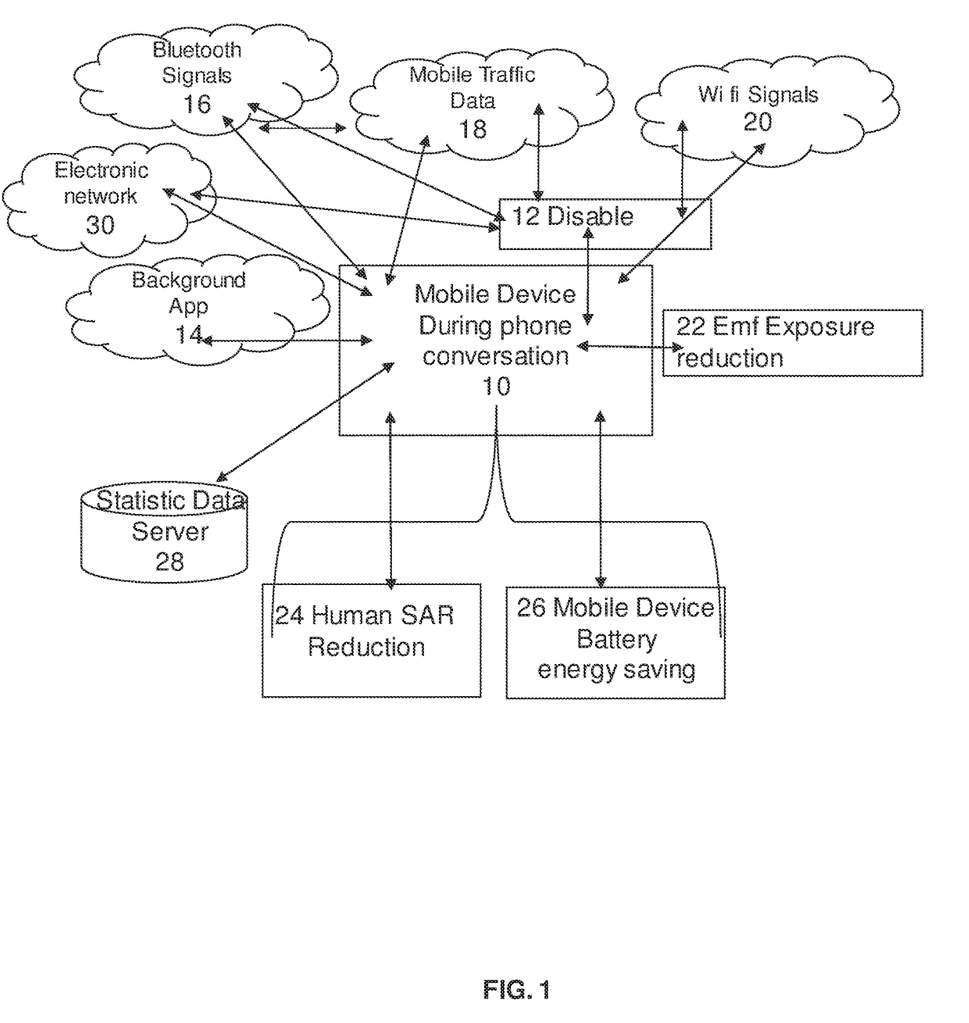
FIG. 1 illustrates a flowchart of a method to disable some mobile device data during a phone conversation according to an embodiment of the invention.

Referring to FIG. 1, a mobile device (10) through a background application ("app") (14) can disable (12) all BLUETOOTH (16), mobile traffic data (18), wi-fi signals (20) and an electronic network (30). The results are that EMF exposure is lower (22) due to Human SAR reduction (24) and device battery life is extended (26). And, data is saved on a statistics data server (28).

Figure 2:
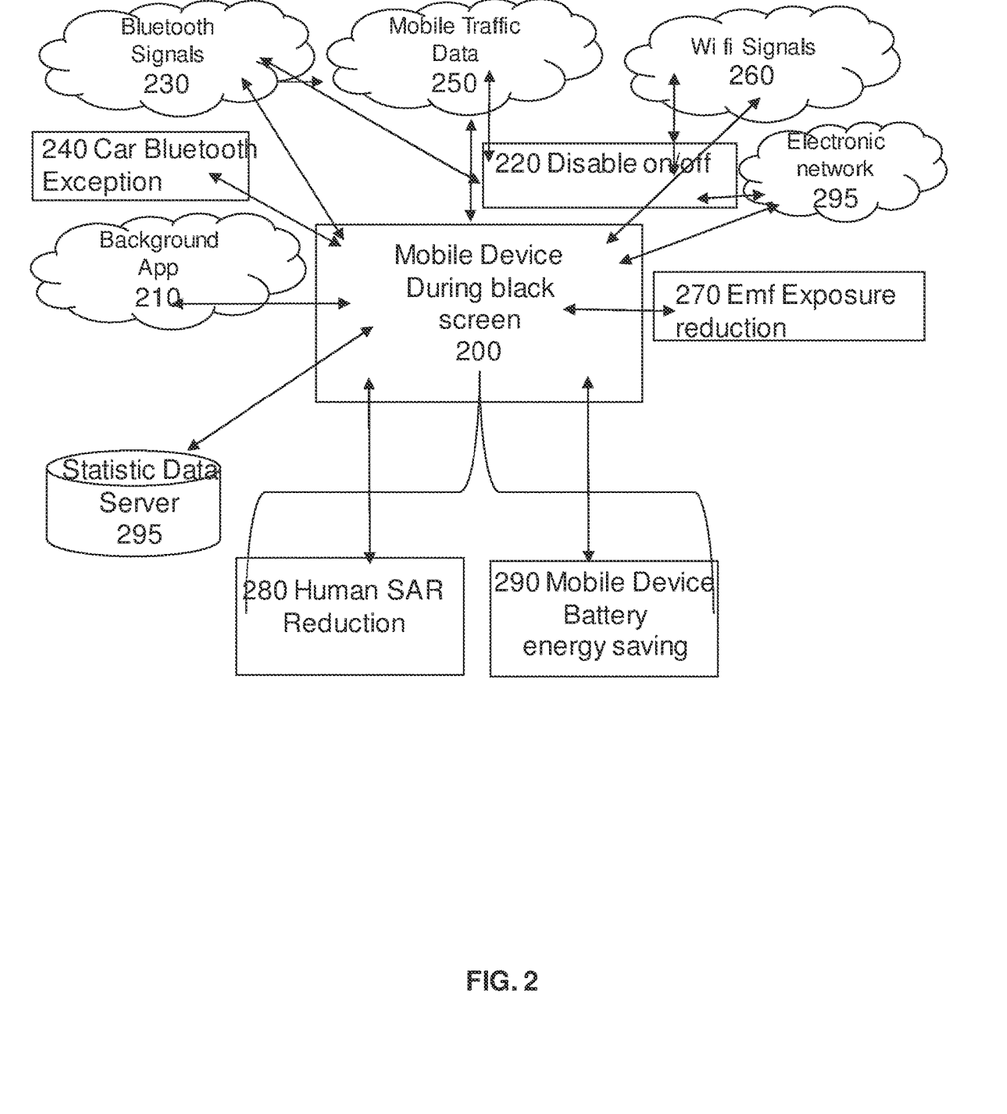
FIG. 2 illustrates a flowchart of a method to disable some mobile device data during a mobile black screen, according to an embodiment of the invention.

Referring to FIG. 2, a mobile device (200) through a background app (210) can disable (220) all BLUETOOTH signals (230) with the exception of car BLUETOOTH coupling (240). The same app (210) can disable mobile traffic data (250), wi-fi signals (260) and an electronic network (295). The results is that EMF exposure is lower (270) due to Human SAR reduction (280) and device battery life is extended (290). And, data is saved on a statistics data server (295).

Figure 3:
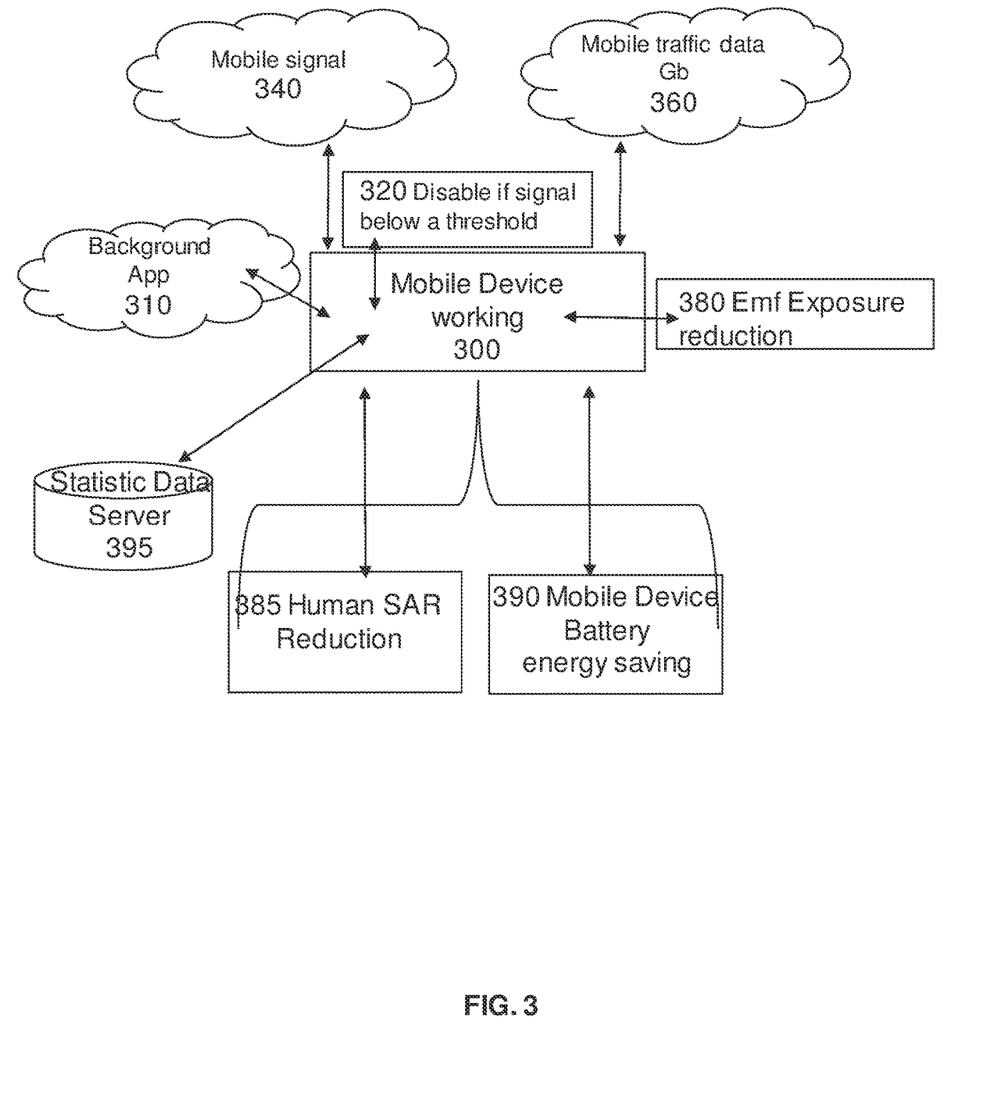
FIG. 3 illustrates a flowchart of a method to disable some mobile device data if a signal is below a threshold, according to an embodiment of the invention.

Referring to FIG. 3, a mobile device in use (300) can disable signals if below a threshold (320) through a background app (310). In particular, the threshold can limit the mobile signal to be received and used (340) and the mobile traffic data (360). This action results in EMF reduction (380), a human SAR reduction (385), a mobile device battery energy savings (390), and data is saved on a statistics data server (395).

Figure 4:
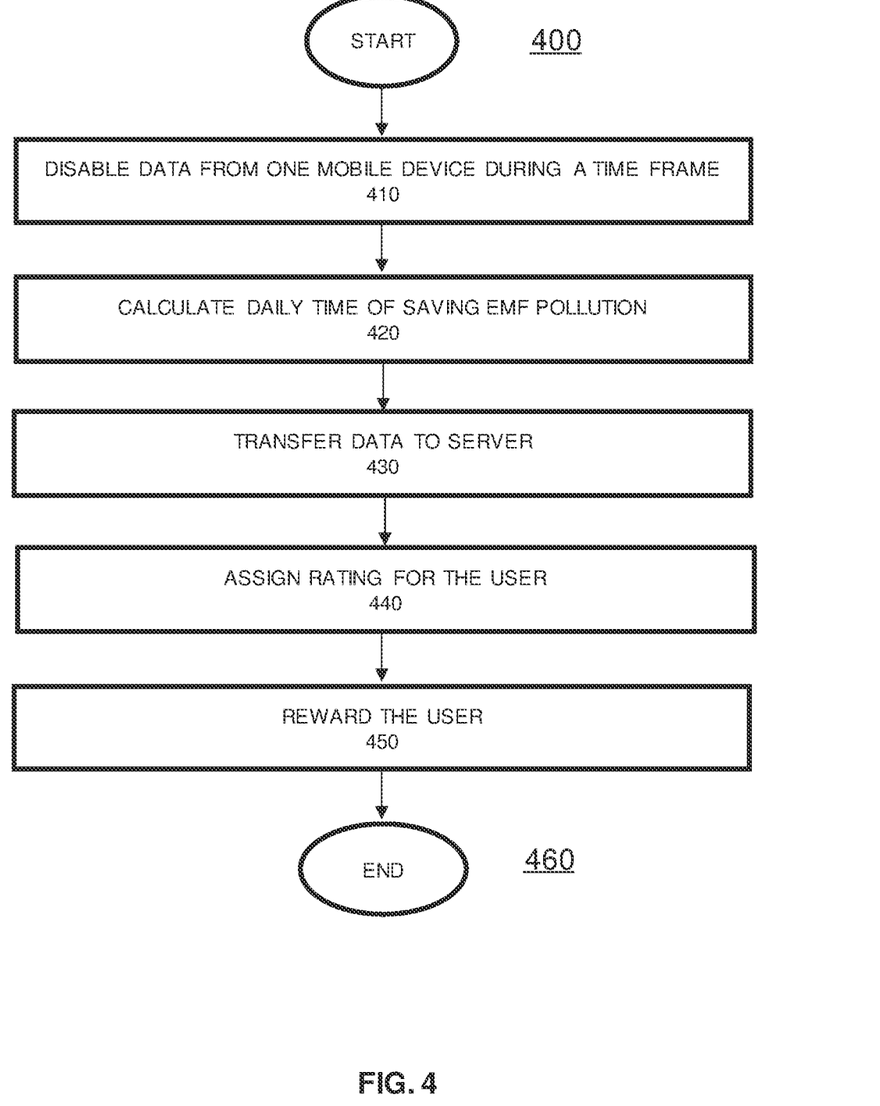
FIG. 4 illustrates a flowchart of disabling data of a mobile device and rewarding a user according to an embodiment of the invention.

Referring to FIG. 4, the process (400) consists of disabling data from one mobile device during a time frame (410), calculating daily time of saving EMF pollution (420), transferring data to a server (430), assigning a rating for the user (440), and rewarding the user (450) to end the process (460).

Figure 5:
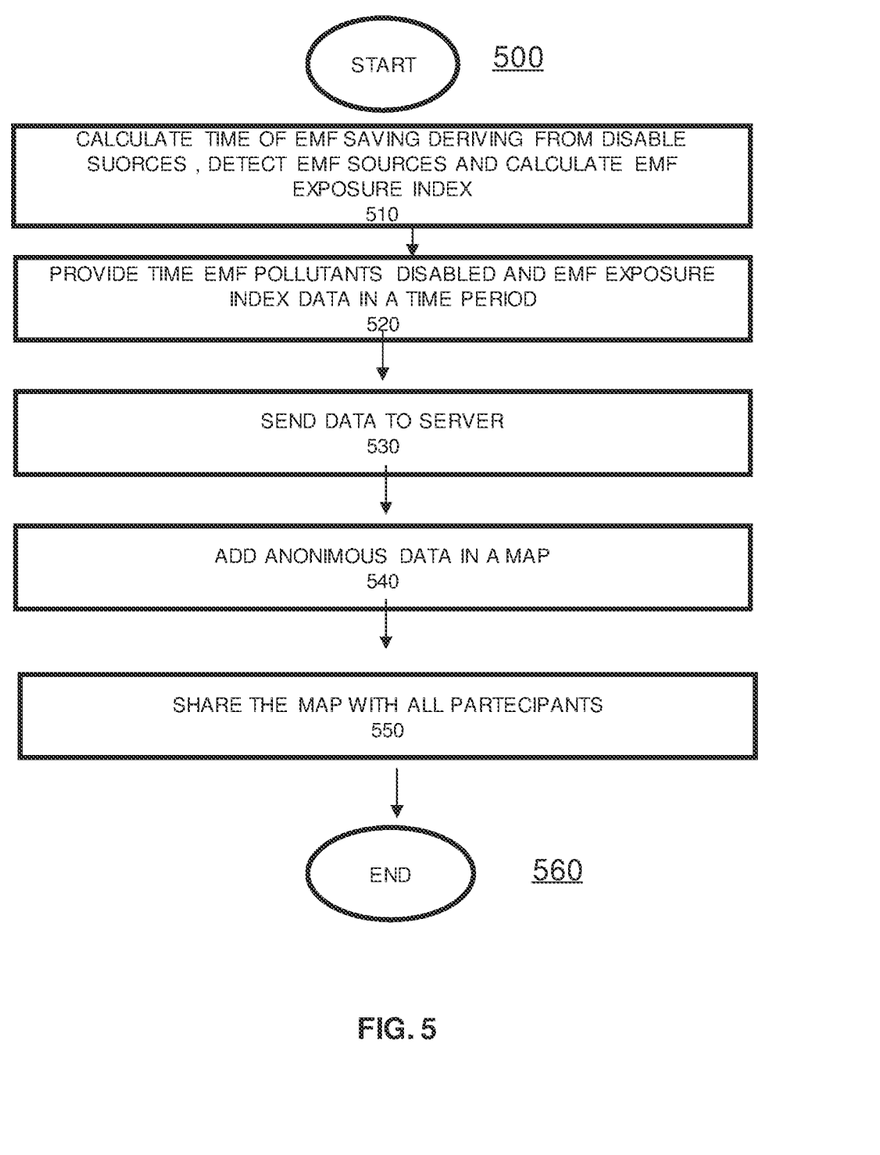
FIG. 5 illustrates a flowchart of disabling data of a mobile device and sharing the information on a map according to an embodiment of the invention.

Referring to FIG. 5, the process (500) consists of calculating time of EMF savings deriving from disabled sources, detecting EMF sources and calculating EMF exposure index (510), providing times EMF pollutants are disabled and EMF Exposure in a time period (520), sending data to a server (530), adding anonymous data in a map (540), sharing the map with all participants and system users (550), and ending the process (560).

Figure 6:
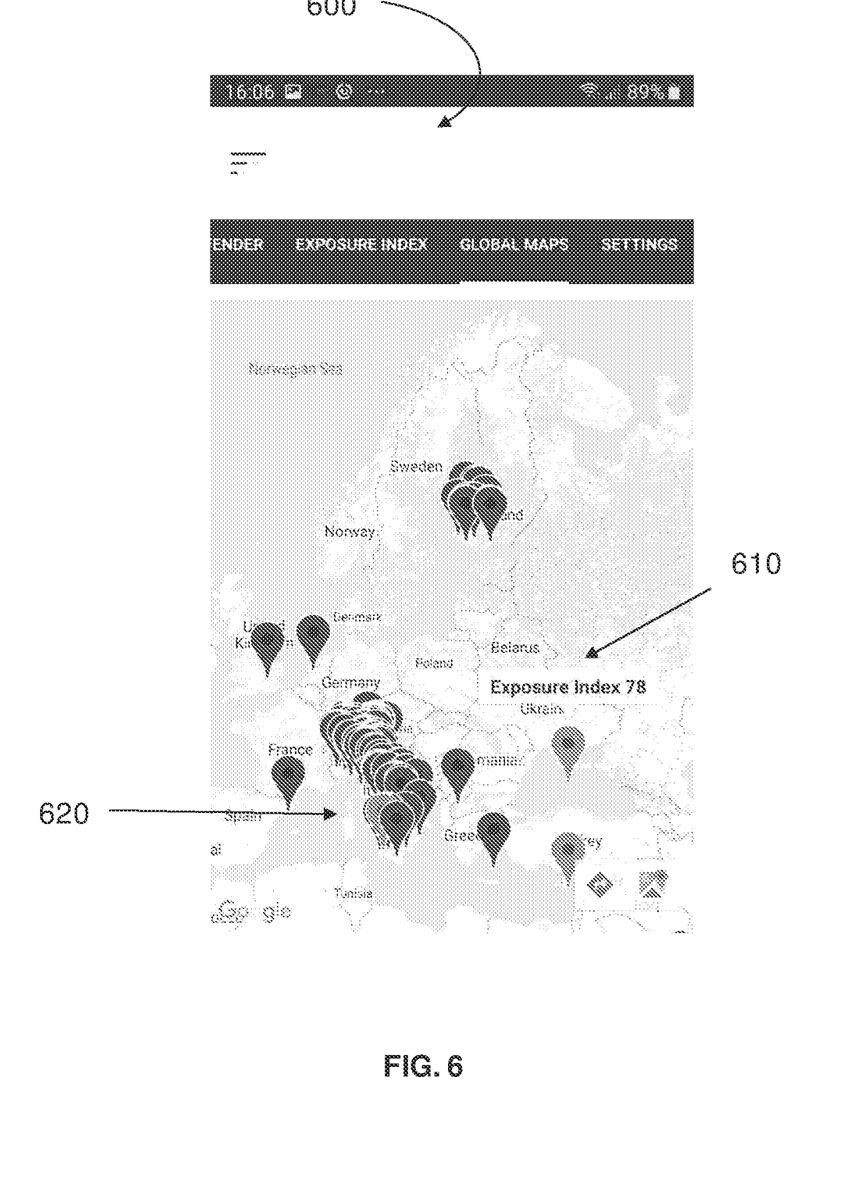
FIG. 6 illustrates a map showing users with their EMF exposure index and their pollution saving information according to an embodiment of the invention.

Referring to FIG. 6, a map (600) displays users and their Exposure Index (610). Depending on the exposure index user values, detector points are of different colors indicating a risk scale (620).

Figure 7:
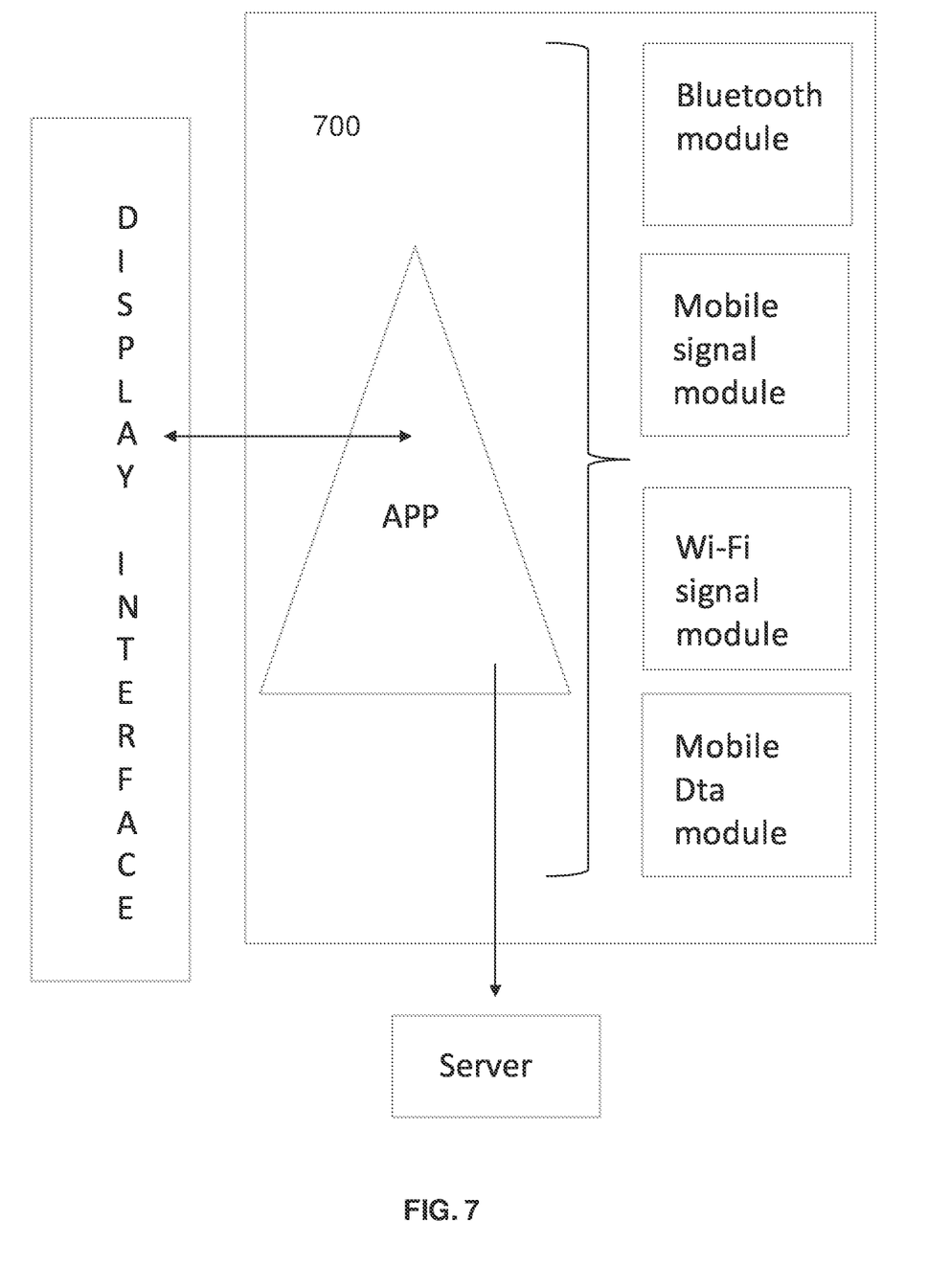
FIG. 7 illustrates a flowchart of a display interface wherein the app software can disable some phone modules according to an embodiment of the invention.

Referring to FIG. 7, a flowchart of a display interface is shown wherein mobile app software (700) can disable some of the phone modules to achieve desired results.

Figure 8:
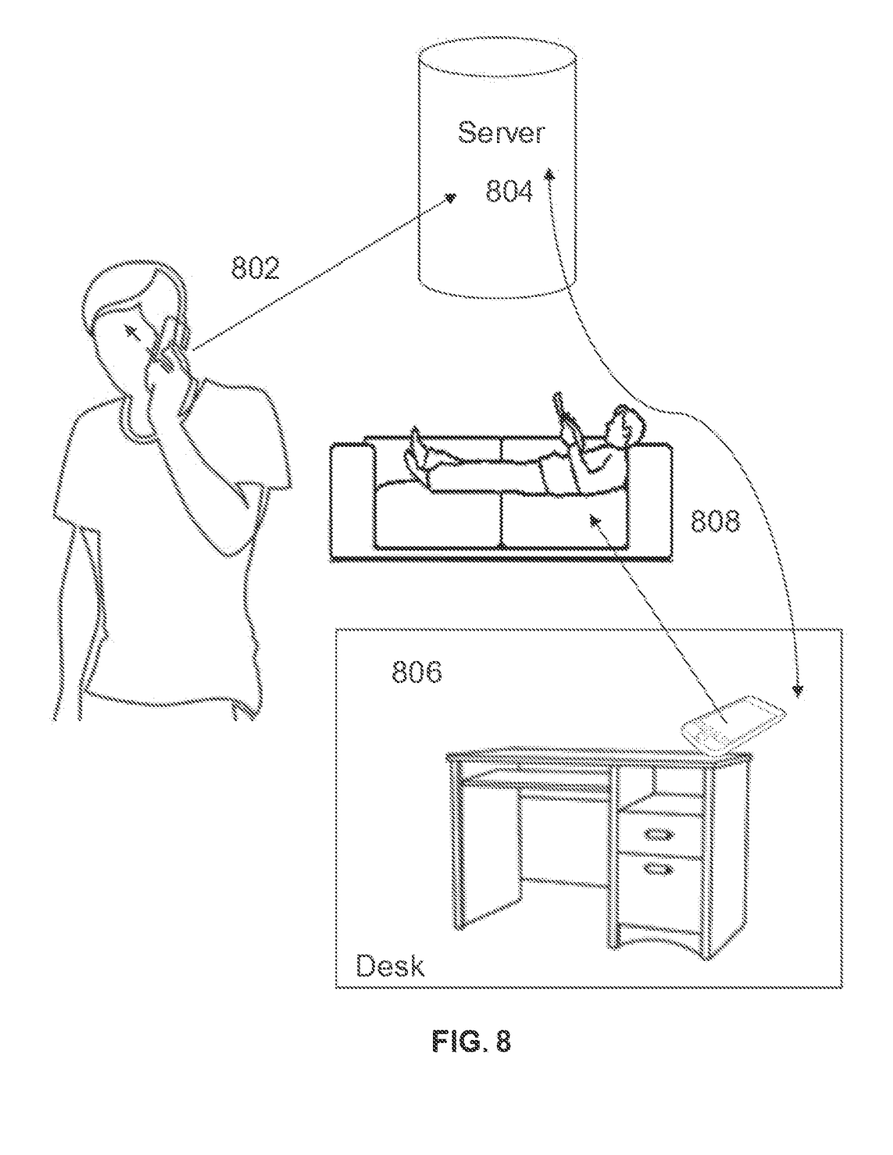
FIG. 8 illustrates a proximity sensor of a mobile device able to increase the accuracy of retrieved data and sending that information to a server according to an embodiment of the invention.

Referring to FIG. 8, a mobile proximity sensors (802) within the mobile device can detect the proximity of the mobile device to a user and send the data to a server (804). In case the mobile device is on a desk (806), and far from the user (808), different sets of data are sent to the server (804). If the user has the phone on his ear the sensor would sense this, and the same if the user has the phone far from them. The sensor can measure that it is not close to their body and give this data to the server. The server can use this data to improve the accuracy and reward users for proper useful behavior.

The methods including algorithms described according to the invention may be included directly in hardware or software programs, software applications executed by a processor, or in any combination. The software may reside in the RAM, flash memory or a read-only memory (ROM), in a programmable memory (PROM) or in an EPROM, EEPROM, registers, hard disks, removable disks, compact disks or another form of storage medium known in the present state of the art. A storage medium, i.e., database, is combined with a processor so that the processor can read the information and write onto the storage medium. Alternatively, the storage medium may reside in a specific integrated circuit (ASIC). The ASIC may reside in a device, a computer, an operating terminal or a mobile device. Alternatively, the processor and the storage medium may reside as electronic components with a single circuit in a device, a computer, an operating terminal or a mobile device.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

Furthermore, the one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s).

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

Reasonable variations and modifications of the illustrated examples in the foregoing written specification and drawings are possible without departing from the scope of the invention. It should further be understood that to the extent the term "invention" is used in the written specification, it is not to be construed as a limited term as to number of claimed or disclosed inventions or the scope of any such invention, but as a term which has long been conveniently and widely used to describe new and useful improvements in technology. The scope of the invention supported by the above disclosure should accordingly be construed within the scope of what it teaches and suggests to those skilled in the art.

What is claimed is:

1. A method for reducing cell phone radiation levels and sharing data with a community on a global map, said method comprising the steps of:
  a. providing a user device; wherein user data is compiled and stored within said user device; wherein said user device is adapted to interact over an electronic network; and wherein said user device is adapted to send said user data over said electronic network; wherein said user device emits radiation while in use;
  b. providing a data server; wherein said data server is electronically connected to said user device and is adapted to receive and send said user data over said electronic network; wherein said data server is adapted to show said user data received from said user device to user data received from said electronic network and is adapted to show said data on a map; and
  a software program; wherein said software program is encoded onto said user device and said data server; and wherein said software program is adapted to calculate an exposure index for radiation levels using said user device; and
  wherein said software program is adapted to disable functions of said user device based on radiation levels emitted by said user device and based on said exposure index to thereby reduce electromagnetic radiation emitted by said user device;
wherein said software program is adapted to reward users based on an exposure index value, wherein a reward is awarded when the user's exposure index value is reduced when the user has placed the user device at a distance from the user leading to reduced radiation exposure.

2. The method for reducing cell phone radiation levels and sharing data with a community on a global map of claim 1, wherein said software program is adapted to disable wi-fi functions from said user device during a phone call and during black screen mode.

3. The method for reducing cell phone radiation levels and sharing data with a community on a global map of claim 1, wherein said software program is adapted to disable BLUETOOTH functions from said user device during a phone call and during black screen mode.

4. The method for reducing cell phone radiation levels and sharing data with a community on a global map of claim 1, wherein said software program is adapted to disable mobile data functions and or said electronic network from said user device during a phone call and during black screen mode.

5. The method for reducing cell phone radiation levels and sharing data with a community on a global map of claim 1, wherein said software program is adapted to disable mobile signal functions from said user device depending on signal strength.

6. The method for reducing cell phone radiation levels and sharing data with a community on a global map of claim 1, wherein said software program is adapted to detect user behavior depending on user device proximity sensors and motion detection.

7. The method for reducing cell phone radiation levels and sharing data with a community on a global map of claim 1, wherein said software program is adapted to send a warning alarm and or a notification as text, light, sound, images, and video on said user device.

8. The method for reducing cell phone radiation levels and sharing data with a community on a global map of claim 1, wherein said software program is adapted to play audio files depending on exposure index values.

9. The method for reducing cell phone radiation levels and sharing data with a community on a global map of claim 1, wherein said data server is adapted to show user exposure index values on a map.

10. The method for reducing cell phone radiation levels and sharing data with a community on a global map of claim 1, wherein said data server is adapted to show user electromagnetic frequency pollution savings on a map with data relating times of usage, and volts and decibel savings.

11. The method for reducing cell phone radiation levels and sharing data with a community on a global map of claim 1, wherein said data server is adapted to send notifications to users.

12. The method for reducing cell phone radiation levels and sharing data with a community on a global map of claim 1, wherein said data server is adapted to represent user index values using colors depending on value levels.

13. A system reducing cell phone radiation levels and sharing data with a community on a global map, comprising:
a mobile device including:
  at least one wi-fi module;
  a BLUETOOTH module;
  a mobile data; and
  a mobile signal module;
  a mobile device processor;
  a mobile device memory unit; and
  a mobile device software program;
  wherein said mobile device software program is stored within said mobile device memory unit and is adapted to be executed by said mobile device processor;
  wherein said mobile device is adapted to interact over a network; and wherein said mobile device is adapted to be carried by person; and
  wherein said mobile device software program is adapted to calculate a user's exposure index; and
  wherein said mobile device software program is adapted to disable at least one of said wi-fi module, said BLUETOOTH module, said network interaction, and said mobile signal module based on radiation levels emitted by said mobile device and based on said user's exposure index to thereby reduce electromagnetic radiation emitted by said mobile device; and
a data server including:
  a data server processor;
  a data server memory unit; and
  a data server software program; vwherein said data server software program is encoded onto said user device and said data server;
  wherein said memory unit is adapted to be executed by said data server processor;
  wherein said data server is adapted to interact over a network; wherein said data server is adapted to send notification to users; wherein said mobile device software program and said data server software program interact via said network and are adapted to show user values and information on a map;
  wherein said software programs are adapted to reward users based on an exposure index value, wherein a reward is awarded when the user's exposure index value is reduced when the user has placed the user device at a distance from the user leading to reduced radiation exposure.

14. The system reducing cell phone radiation levels and sharing data with a community on a global map of claim 13, wherein said software program is adapted to detect user behavior depending on user device proximity sensors and motion detection.

15. The system reducing cell phone radiation levels and sharing data with a community on a global map of claim 13, wherein said mobile device software program is adapted to play audio files depending on exposure index user values.

16. The system reducing cell phone radiation levels and sharing data with a community on a global map of claim 13, wherein said mobile device software program is adapted to send a warning alarm as text, light, sound, images, and video on said mobile device.

* * * * *